Jan. 14, 1936. W. R. BLAIR 2,027,367
SYSTEM OF DETERMINING METEOROLOGICAL CONDITIONS BY RADIO
Filed Feb. 15, 1932 2 Sheets-Sheet 1
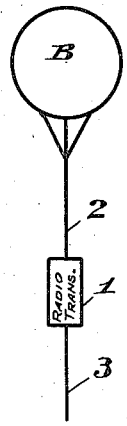
FIG. 1.
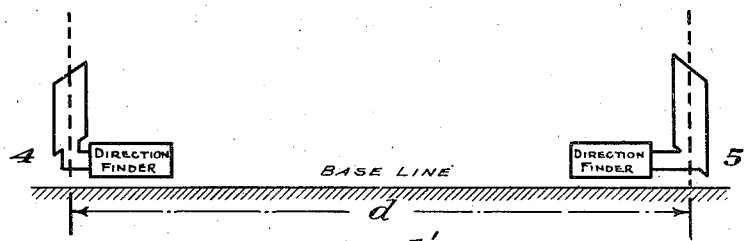
FIG. 2.
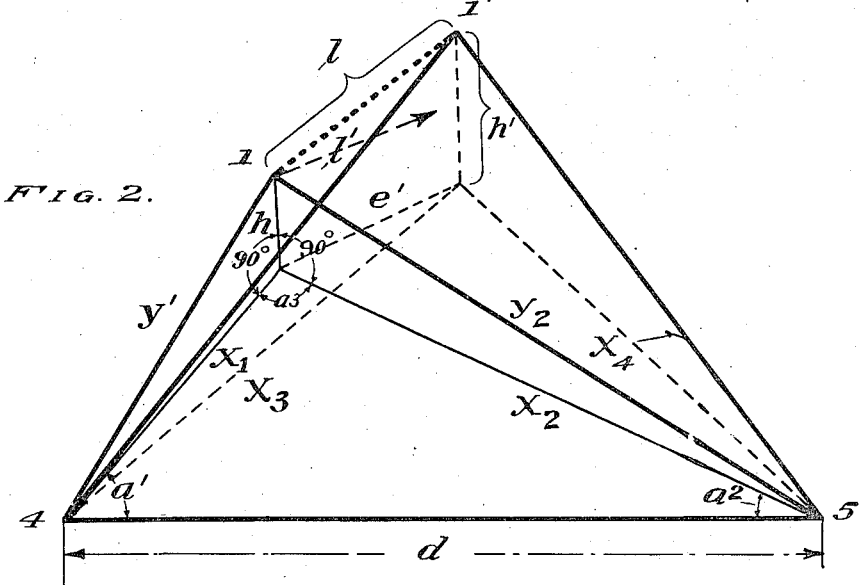
INVENTOR
WILLIAM R. BLAIR
BY Francis H. Vanderwerker
Charles A. Rose
ATTORNEY

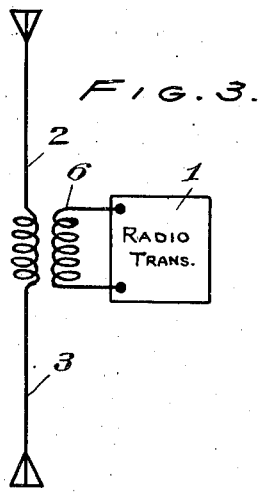
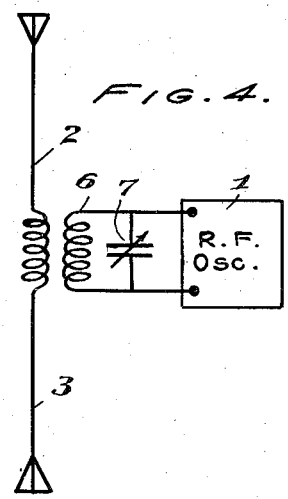
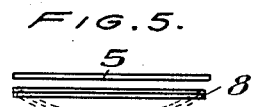
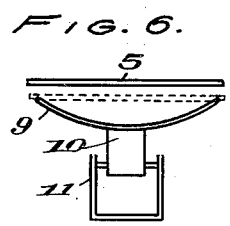
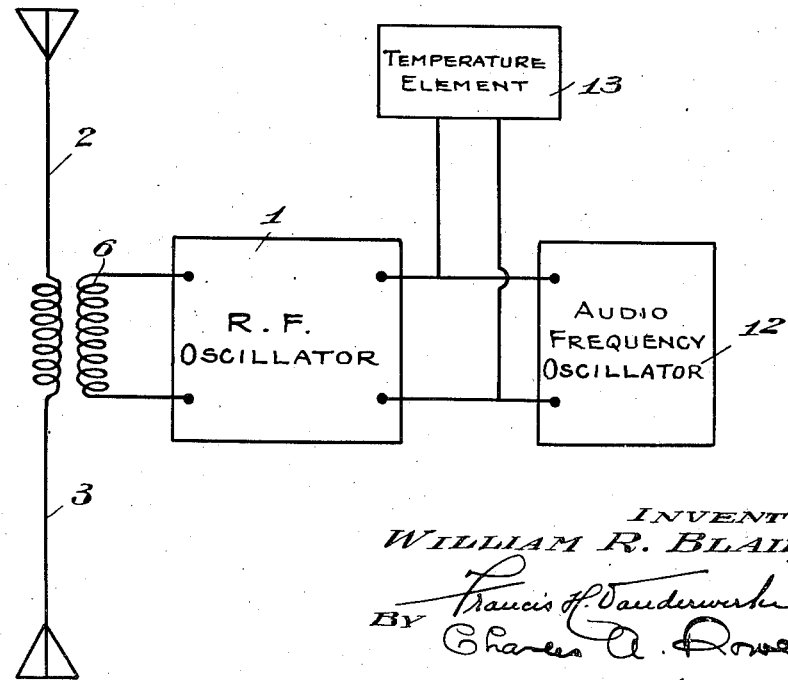

Patented Jan. 14, 1936

2,027,367

UNITED STATES PATENT OFFICE 2,027,367

SYSTEM OF DETERMINING METEOROLOGICAL CONDITIONS BY RADIO

William R. Blair, Fort Monmouth, Oceanport, N. J.

Application February 15, 1932, Serial No. 593,112

11 Claims. (Cl. 250—2)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a system of employing radio for determining meteorological conditions of the atmosphere.

The determination of the characteristics of the upper air currents has been under investigation by scientists for many years. The apparatus heretofore available for securing such data has left a great deal to be desired. Certain meteorological data, such as direction and speed of the wind, have usually been secured by sending aloft a free balloon and tracking it with a theodolite. This method has certain definite limitations which permit its use only under the most favorable conditions; that is, such a system requires visual observation of the balloon at all times. The presence of fog or clouds, therefore, imposes a barrier beyond which data cannot be secured. The unreliability of the system is apparent as well as its definite limitations.

When other data, such as the temperature and pressure of the upper air currents, have been desired, use has been made of certain other devices such as "meteorographs", sending them aloft by means of free balloons. With this method, the ability to recover the unit upon its return to earth at some distant point is depended upon in order to secure any data whatsoever. Thus, not only is there a possibility that the unit will not be returned, but that a serious time delay might render the data secured of little value, particularly if air conditions were changing appreciably. In order to overcome this limitation I have developed a radio method whereby all the desired data are made instantly available at one or more fixed or ground stations.

It is an object of the present invention to determine the meteorological conditions or characteristics of upper air currents, such as wind direction and speed, temperature, barometric pressure and similar elements by tracking a radio transmitter carried by an aerial moving body such as a free balloon. The invention contemplates a system of tracking or locating such a transmitter and thus determining at any instant the elevation, wind direction and speed for example by means of direction finding receivers, at least two of which may be employed.

Another object of the invention is the transmission of characteristics of the upper air such as changes in temperature or pressure by varying the radio frequency of such a transmitter. Similarly, the invention also contemplates the transmission of any of such factors by varying the audio frequency of the transmitter, which in turn modulates the radio frequency.

A further object is the transmission simultaneously of such factors as both temperature and pressure, employing changes both of the audio and the radio frequency of the aerial transmitter. The invention also contemplates the instant determination of the various characteristics or factors mentioned herein at fixed or ground stations.

These objects are attained by the use of a radio transmitter, that is to say, signalling apparatus embodying means whereby one element such as temperature may be transmitted by varying the audio frequency of the transmitter to produce changes proportional to temperature, and in addition varying the radio frequency in accordance with pressure or vice versa. The determination of the elements thus transmitted is contemplated by employing properly coordinated receiving and/or recording apparatus located at fixed or ground stations.

My invention may best be understood by reference to the accompanying drawings, in which:

Fig. 1 shows diagrammatically an arrangement for obtaining such factors as direction and speed of upper air currents;

Fig. 2 illustrates the manner of computing the direction and speed of air movement at any time;

Fig. 3 illustrates schematically a radio transmitter coupled to an antenna system;

Fig. 4 is a similar view in which a capacitor is shown for varying the frequency of transmission;

Figs. 5 and 6 are detailed views of arrangements for varying the capacity element of the transmitter in accordance with changes of temperature and pressure, respectively; and Fig. 7 illustrates schematically a transmitting apparatus incorporating an audio frequency oscillator.

In Fig. 1 is illustrated the method of obtaining the direction and speed of the upper air currents. I represents the radio transmitter exciting the two antenna wires 2 and 3 which form the legs of a dipole radiator. B is a free balloon of sufficient lift to carry the complete transmitter aloft at a suitable rate. The transmitter I is preferably of the vacuum tube type although it is not proposed to limit this invention to any particular design. It is very important to keep the weight low in order to secure the desired ascensional rate with as small a balloon or balloons as possible. The choice of the type of vacuum tube to employ is, of necessity, limited to those of the receiving type with low filament and plate current consumption.

The two direction finding receivers 4 and 5 on the base line locate the transmitter and enable a horizontal projection of its course to be plotted. A uniform rate of ascent is assumed. This assumption has been justified by many test runs. Readings of both direction finders are taken simultaneously minute by minute enabling the path of the balloon to be followed.

Fig. 2 illustrates the manner of computing the direction and speed of the air movement at any time. Actually the data are employed in plotting the horizontal projection of the balloon's path. From this plot wind direction and speed are read directly by means of appropriate scales. Results are obtained more easily and accurately by means of the graphic method. Referring to Fig. 2, observations taken from direction finding receivers 4 and 5 determine the location at a given time of the transmitter 1, the height of the transmitter being designated by $h$. The lines $x_1$, $x_2$ and $d$ bound a triangle, which forms the base of a three-dimensional figure. The value of $d$ and adjacent angles being known the values of $x_1$ and/or $x_2$ may be computed from the relation $$\frac{x_1}{\sin a_2} = \frac{x_2}{\sin a_1} = \frac{d}{\sin a_3}$$

Similarly, an observation taken at 4 and 5 at another time interval determines the location of the transmitter at 1'. At the time of such further observation, $h'$ would represent the height of the transmitter. The value of $x_3$ and/or $x_4$, may be computed as before. In this manner, direction and velocity of wind may be determined. Thus:

The horizontal distance traveled by the transmitter $t = e'$;

Direction of wind = direction of $e'$

Speed of wind = $\frac{e'}{t}$

Assume that the balloon carrying the transmitter is started up at receiver station 4. Directed dimensions $x_1$, $x_3$, $x_5$, etc. can be laid out to scale on a suitable plotting board. A line connecting the outer extremities of $x_1$, $x_3$, $x_5$, etc. is a close approximation to a horizontal projection of the transmitter path. Using appropriate scales, wind direction and speed can be read directly from this horizontal projection.

The advantages of the radio method of tracking over the theodolite method are obvious when a comparison of the availability of the two methods is made. When more complete data of the upper air are desired, that is pressure or temperature indication, the apparatus may be modified to allow the changes in either one or both to be recorded at the ground stations.

Referring to Fig. 3, there is shown a radio transmitter 1, feeding the two antenna legs 2 and 3 by means of the coupling coil 6. If a capacitor 7 be shunted across coil 6, as shown, the frequency of transmission will be effectively changed (see Fig. 4). If the capacitor be caused to vary in accordance with the temperature or pressure changes, the transmitter frequency will change in accordance with the same variation. These changes are indicated, and may be recorded, at the ground station, thus making accurate and instantaneous indications available. Fig. 5 illustrates one method of constructing capacitor 7 employing a bi-metallic plate 8, said plate consisting of metallic elements having different coefficients of expansion, so that plate 8 moves with temperature change relative to stator plate 5, thereby changing the capacity of the system. Fig. 6 illustrates a means of adjusting a capacitor to respond to pressure variations. The curved plate 9, forming the movable plate of the condenser, is secured to a piston 10 which is free to move in cylinder 11. The motion of the piston will vary with the surrounding air pressure thus causing the distance separation of plate 9 to vary relative to stator plate 5, and consequently the capacity will be varied accordingly. Other means of obtaining temperature and pressure indications are apparent and this invention is not limited to any particular type. Thus a thermometric or barometric control of the capacity of the condenser might easily be employed.

Fig. 7 illustrates a transmitter incorporating an audio oscillator 12 to be varied in accordance with temperature. The temperature element 13 may be thermometrically controlled or any of the other methods previously described may be modified to be used with audio oscillators. Further simplification of the transmitter may be secured by the use of a self-modulated oscillator the details of which are disclosed in a co-pending patent application of Ralph I. Cohn, entitled "Vacuum tube oscillators" Serial No. 592,287 filed February 11, 1932. The adaptation of such a transmitter may readily be made to serve the purposes of this invention. Any change in plate impedance produces a change in modulation, hence thermometric control may be adopted or the temperature coefficient of the external plate impedance may be employed to determine the changes in audio frequency. Perhaps one of the easiest to adopt would be a comparison method whereby the received audio frequency is compared with a locally generated audio frequency which in turn may be reduced to temperature variations. Other methods may be used with equal success. If it is desired to record the data a recording frequency meter may be employed. It is not proposed to limit this invention to any particular method.

I claim:

1. In a system of the character described, employing an aerial moving body freely subject to atmospheric influences and adapted to carry a radio transmitter in radio communication with an observation station; the method of determining meteorological conditions, which consists in generating radio frequency oscillations from said transmitter; modulating said oscillations quantitatively in accordance with characteristics of the atmosphere; and detecting the modulated energy at the observation station.

2. In a system of the character described, employing an aerial moving body freely subject to atmospheric influences and adapted to carry a radio transmitter in radio communication with an observation station; the method of determining meteorological conditions, which consists in generating at said body oscillatory energy both at radio and audio frequency; varying the audio frequency quantitatively in accordance with a characteristic of the atmosphere; then causing the audio frequency to modulate the radio frequency; and detecting the modulated energy at the observation station.

3. In a system of the character described, employing an aerial moving body freely subject to atmospheric influences and adapted to carry a radio transmitter in radio communication with an observation station; the method of determining meteorological conditions, which consists in operating the said transmitter as a self-modulated oscillator; generating oscillations both at radio and audio frequency; varying the audio frequency in accordance with one characteristic of the atmosphere; varying the radio frequency in accordance with another characteristic of the atmosphere; and detecting the modulated energy at the observation station.

4. A system of determining meteorological conditions by radio, comprising an aerial body free to float in the air under atmospheric influences; a modulated transmitter carried by said body comprising means for sending out wave energy both at radio frequency and audio frequency; means for varying the radio and audio frequency in accordance with characteristics of the atmosphere; and means at a fixed observation station for receiving and translating the wave energy.

5. A system of determining meteorological conditions by radio, comprising an aerial body free to float in the air under atmospheric influences; a self-modulated transmitter carried by said body comprising means for generating wave energy both at radio and at audio frequency; means for varying the audio frequency proportional to temperature; means for varying the radio frequency proportional to pressure; and means at a fixed observation station for receiving and translating said energy in terms of degrees temperature and barometric pressure.

6. A system of determining meteorological conditions by radio, which employs a free balloon subject to atmospheric influences; a self-modulated transmitter carried by said balloon, comprising means for generating wave energy both at radio frequency and at audio frequency; means for varying the audio frequency quantitatively in proportion to a characteristic of the atmosphere; means for modulating the radio frequency by means of the audio frequency; and means at a fixed observation station for receiving and detecting the modulated energy.

7. A system of determining meteorological conditions by radio, which employs a free balloon subject to atmospheric influences; a self-modulated transmitter carried by said balloon, comprising means for generating wave energy both at radio frequency and at audio frequency; means for varying the radio frequency proportional to a characteristic of the atmosphere; means for modulating the radio frequency by means of the audio frequency; and means at a fixed observation station for receiving and detecting the modulated energy.

8. In a system of the character described, employing a balloon of predetermined rate of ascent free to move under the action of wind forces, whose altitude is a determinable factor at all times, and a self-modulated radio transmitter carried by said balloon in communication with at least two fixed observation stations equipped with radio receivers adapted for direction finding in altitude and azimuth; the method of determining space position and space wind directions and speeds, which comprises sending modulated wave energy from the transmitter; simultaneously detecting the energy at said observation stations to obtain position bearings on said transmitter; utilizing said bearings in combination with known altitude values to obtain space positions; repeating these observations at known intervals to determine space position relative to time; and employing both ascensional rate and indicated direction for deducing the horizontal components of wind direction and speed in accordance with movements of said balloon as indicated by changes of location of said transmitter.

9. A system of determining meteorological conditions by radio, comprising an aerial body free to float in the air under atmospheric influences; a modulated transmitter carried by said body comprising means for sending out wave energy both at radio frequency and at audio frequency; means for simultaneously varying the radio and audio frequencies independently and in accordance with two distinct characteristics of the atmosphere; and means at a fixed observation station for receiving and interpreting the wave energy.

10. A system of the character described, comprising a buoyant aerial body free to float under influence of air currents; a self-modulated transmitter carried by said body, comprising means for generating wave energy both at high and low frequencies; means to vary both the high and low frequencies quantitatively in response to conditions extraneous to the transmitter; and means in remote radio communication with said transmitter for receiving and evaluating said frequencies in terms of said extraneous conditions.

11. A system of the character described, comprising a buoyant aerial body free to float under the influence of air currents; a self-modulated transmitter carried by said body, comprising means for generating a carrier wave at radio frequency; means for varying the carrier frequency in accordance with an atmospheric condition external to the said transmitter; means for modulating the carrier in accordance with another atmospheric condition; and means in remote radio communication with said transmitter for receiving and evaluating said modulated wave energy in terms calibrated to measure said conditions.

WILLIAM R. BLAIR.